United States Patent
Koiwa

(10) Patent No.: US 10,107,230 B2
(45) Date of Patent: Oct. 23, 2018

(54) COVER MEMBER OF INTERNAL COMBUSTION ENGINE

(71) Applicant: HONDA MOTOR CO., LTD., Tokyo (JP)

(72) Inventor: Yojiro Koiwa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 76 days.

(21) Appl. No.: 15/293,282

(22) Filed: Oct. 14, 2016

(65) Prior Publication Data
US 2017/0107940 A1    Apr. 20, 2017

(30) Foreign Application Priority Data
Oct. 16, 2015 (JP) ................................. 2015-204696

(51) Int. Cl.
| | | |
|---|---|---|
| F02F 7/00 | (2006.01) | |
| F01M 11/00 | (2006.01) | |
| F01M 9/08 | (2006.01) | |
| F16H 57/05 | (2006.01) | |

(52) U.S. Cl.
CPC ............ *F02F 7/0039* (2013.01); *F01M 9/08* (2013.01); *F01M 11/0004* (2013.01); *F02F 7/0073* (2013.01); *F16H 57/05* (2013.01); *F01M 2011/0083* (2013.01); *F02F 2007/0075* (2013.01); *F02F 2007/0078* (2013.01); *F16N 2210/33* (2013.01)

(58) Field of Classification Search
CPC .......... F02F 7/0039; F01M 2011/0083; F01M 11/0004
USPC ...... 123/198 E, 198 P, 195 C, 196 CP, 90.38
See application file for complete search history.

(56) References Cited

U.S. PATENT DOCUMENTS

| | | | | |
|---|---|---|---|---|
| 2005/0241606 A1* | 11/2005 | Francis | ................. | F01M 11/02 |
| | | | | 123/195 C |
| 2010/0024761 A1* | 2/2010 | Yasui | ...................... | F01M 1/12 |
| | | | | 123/196 R |
| 2013/0133611 A1* | 5/2013 | Koiwa | ................... | F02B 77/00 |
| | | | | 123/195 C |

FOREIGN PATENT DOCUMENTS

| | | |
|---|---|---|
| JP | 63-154709 U | 10/1988 |
| JP | 64-053427 U | 4/1989 |
| JP | 2013-113166 | 6/2013 |

OTHER PUBLICATIONS

Japanese Office Action for corresponding JP Application No. 2015-204696, dated Aug. 9, 2017 (w/ English machine translation).

* cited by examiner

Primary Examiner — Syed O Hasan
(74) Attorney, Agent, or Firm — Mori & Ward, LLP

(57) ABSTRACT

A cover of an internal combustion engine includes a cover body to be mounted to a crankcase of the internal combustion engine. The cover body includes a through hole, a protruding part, and a plurality of first recessed grooves. The through hole is to support a shaft rotatably. The protruding part is provided above the through hole in an upward direction of the internal combustion engine and protrudes toward an inside of the cover body facing the crankcase. The protruding part includes a first upper part and a first lower part in the upward direction on an inner surface of the protruding part facing the crankcase. The plurality of first recessed grooves extend radially from the through hole so as to connect the upper part and the lower part of the protruding part.

15 Claims, 7 Drawing Sheets

COVER MEMBER OF INTERNAL COMBUSTION ENGINE

CROSS-REFERENCE TO RELATED APPLICATIONS

The present application claims priority under 35 U.S. C. § 119 to Japanese Patent Application No. 2015-204696, filed Oct. 16, 2015. The contents of this application are incorporated herein by reference in their entirety.

BACKGROUND OF THE INVENTION

Field of the Invention

The present invention relates to a cover member of an internal combustion engine.

Discussion of the Background

A chain cover of an internal combustion engine is disclosed in a Japanese Patent Application Publication No. 2013-113166. This chain cover has a first rib which projects from an inner surface of the chain cover and extends in an axial direction of a cylinder, and a second rib which projects from the inner surface of the chain cover so as to connect a lateral edge part of the chain cover and the first rib and is inclined downwardly in the axial direction of the cylinder with approach toward the first rib. The first rib and the second rib are configured to increase the rigidity of the chain cover thereby to suppress a vibration thereof, and configured to improve lubrication performance by guiding oil flowing downward by gravity along the first rib and the second rib, to a sprocket provided on a crankshaft.

SUMMARY OF THE INVENTION

According to one aspect of the present invention, in a cover member to be mounted on a casing of an internal combustion engine, the cover member includes a through hole for rotatably supporting a shaft, a protruding part being positioned above the through hole and protruding toward an inside of the cover member, and a plurality of recessed grooves extending radially from the through hole so as to provide a connection between an upper part and a lower part of the inner surface side of the protruding part.

According to another aspect of the present invention, a cover of an internal combustion engine includes a cover body to be mounted to a crankcase of the internal combustion engine. The cover body includes a through hole, a protruding part, and a plurality of first recessed grooves. The through hole is to support a shaft rotatably. The protruding part is provided above the through hole in an upward direction of the internal combustion engine and protrudes toward an inside of the cover body facing the crankcase. The protruding part includes a first upper part and a first lower part in the upward direction on an inner surface of the protruding part facing the crankcase. The plurality of first recessed grooves extend radially from the through hole so as to connect the upper part and the lower part of the protruding part.

According to further aspect of the present invention, a cover of an internal combustion engine includes a cover body to be mounted to a crankcase of the internal combustion engine. The cover body includes a through hole, a protruding part, a plurality of inner recessed grooves. The through hole has a center axis to rotatably support a shaft about the center axis. The cover body has an axial direction in which the center axis extends and a radial direction perpendicular to the axial direction. The cover body has a cover body inner surface to face the crankcase and a cover body outer surface opposite to the cover body inner surface in the axial direction. The axial direction includes an inward direction directed from the cover body outer surface to the cover body inner surface. The protruding part is connected to the cover body and positioned apart from the through hole in the radial direction. The protruding part protrudes from the cover body inner surface in the inward direction. The protruding part has a protruding part inner surface connected to the cover body inner surface and a protruding part outer surface connected to the cover body outer surface. The protruding part inner surface has a first inner periphery facing the through hole in the radial direction and a first outer periphery opposite to the first inner periphery in the radial direction. The plurality of inner recessed grooves extend in the radial direction from the first outer periphery of the protruding part to the first inner periphery of the protruding part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
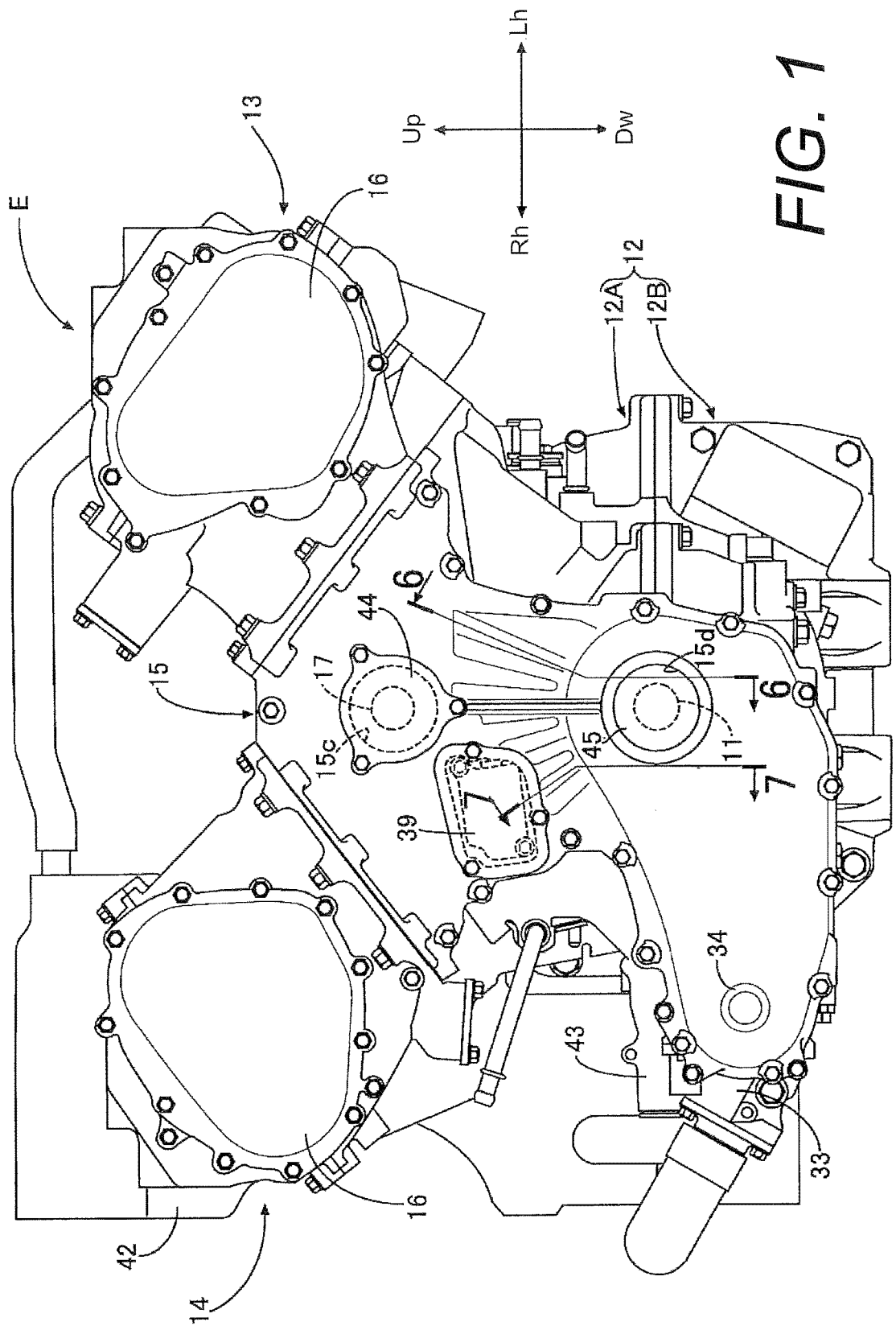
FIG. 1 is a front view of a V-type internal combustion engine.

The embodiments will now be described with reference to the accompanying drawings, wherein like reference numerals designate corresponding or identical elements throughout the various drawings.

Hereunder, an embodiment of the present invention will be explained with reference to FIGS. 1 to 7. In this specification, a forward and rearward direction, a left and right direction and an upward and downward direction are defined based on a driver seated on a driver's seat.

Figure 2:
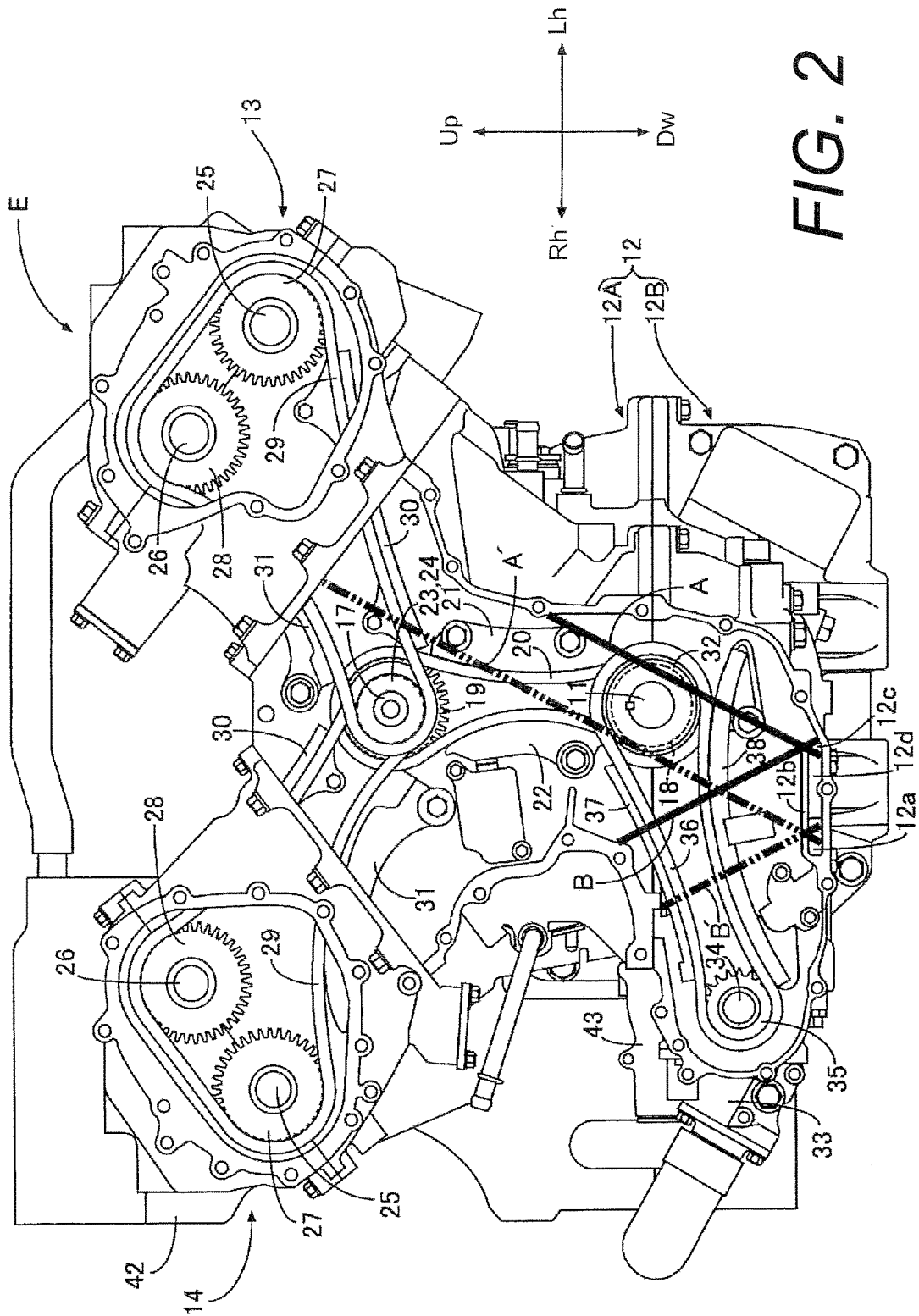
FIG. 2 is a view showing a state of removing a chain cover from FIG. 1.

As shown in FIGS. 1 and 2, a V-type multiple cylinder internal combustion engine E is loaded on a vehicle body in a condition where an axis of a crankshaft 11 extends along the forward and rearward direction. A crankcase 12 is formed by having an upper crankcase half body 12A and a lower crankcase half body 12B united integrally with each other. A left bank 13 and a right bank 14 project obliquely upward in a V-shape from an upper part of the upper crankcase half body 12A. A front face of the crankcase 12 is covered with a removable main chain cover 15. Opening portions located on front faces of the left and right banks 13, 14 are covered with removable sub chain covers 16, 16, respectively.

The crankshaft 11 is held between the upper crankcase half body 12A and the lower crankcase half body 12B which constitute the crankcase 12. A cooling water pump (not shown) is connected to a cooling water pump shaft 17 which is rotatably supported on the upper crankcase half body 12A above the crankshaft 11. A cooling water pump drive sprocket 18 fixedly secured to the crankshaft 11 and a cooling water pump driven side sprocket 19 fixedly secured to the cooling water pump shaft 17 are connected by a cooling water pump driving chain 20. A chain guide 21 makes contact with a tension side of the cooling water pump driving chain 20, and a chain tensioner 22 makes contact with a loose side of the cooling water pump driving chain 20.

Further, a first cam drive sprocket 23 and a second cam drive sprocket 24 are fixedly secured to the cooling water pump shaft 17. The first cam drive sprocket 23 is connected through a timing chain 29 to an intake cam sprocket 27 and an exhaust cam sprocket 28 which are fixedly secured to an intake cam shaft 25 and an exhaust cam shaft 26 each of which is rotatably supported on the left bank 13. Similarly, the second cam drive sprocket 24 is connected through a timing chain 29 to an intake cam sprocket 27 and an exhaust cam sprocket 28 which are fixedly secured to an intake cam shaft 25 and an exhaust cam shaft 26 each of which is rotatably supported on the right bank 14. Chain guides 30 make contact with tension sides of each of the timing chain 29, and chain tensioners 31 make contact with loose sides of each of the timing chains 29.

A scavenging pump drive sprocket 32 fixedly secured to the crankshaft 11 is connected through a scavenging pump drive chain 36 to a scavenging pump driven side sprocket 35 which is fixedly secured to a scavenging pump shaft 34 of a scavenging pump 33 located in the lower crankcase half body 12B. A chain guide 37 makes contact with a tension side of the scavenging pump drive chain 36, and a chain tensioner 38 makes contact with a loose side of the scavenging pump drive chain 36.

Next, a structure of the main chain cover 15 will be explained with reference to FIGS. 3 to 7.

On an outer peripheral part of the main chain cover 15 consisting of a plate shaped member, there is formed a flange 15b which has a plurality of bolt holes 15a for fastening the main chain cover to the crankcase 12 by bolts. In an upper part and a lower part of the main chain cover 15, there are formed two through holes 15c, 15d which face axial end portions of the cooling water pump shaft 17 and the crankshaft 11. The through hole 15c on the upper side supports the axial end portion of the cooling water pump shaft 17 and is closed by a removable lid member 44 (see FIG. 1). The through hole 15d on the lower side is closed by a seal member 45 (see FIG. 6) for providing a seal between the through hole and the axial end portion of the crankshaft 11. On the right side of these two through holes 15c, 15d, there is formed an opening portion 15e for carrying out the maintenance of the chain tensioner 22 of the cooling water pump driving chain 20. This opening portion 15e is closed by a removable lid member 39 (see FIG. 1).

A protruding part 15f is located in the vicinity of the opening portion 15e in such a condition as to cross, in the left and right direction, a region sandwiched by the two through holes 15c, 15d of the main chain cover 15 from above and below, and is configured to protrude toward the inner surface side of the main chain cover 15. The protruding part 15f is illustrated by the two-dot chain line in each drawing. Therefore, an upper space 40 for accommodating the pair of timing chains 29, 29 is defined above the protruding part 15f, and a lower space 41 for accommodating the scavenging pump drive chain 36 is defined below the protruding part 15f (see FIGS. 6 and 7).

Figure 3:
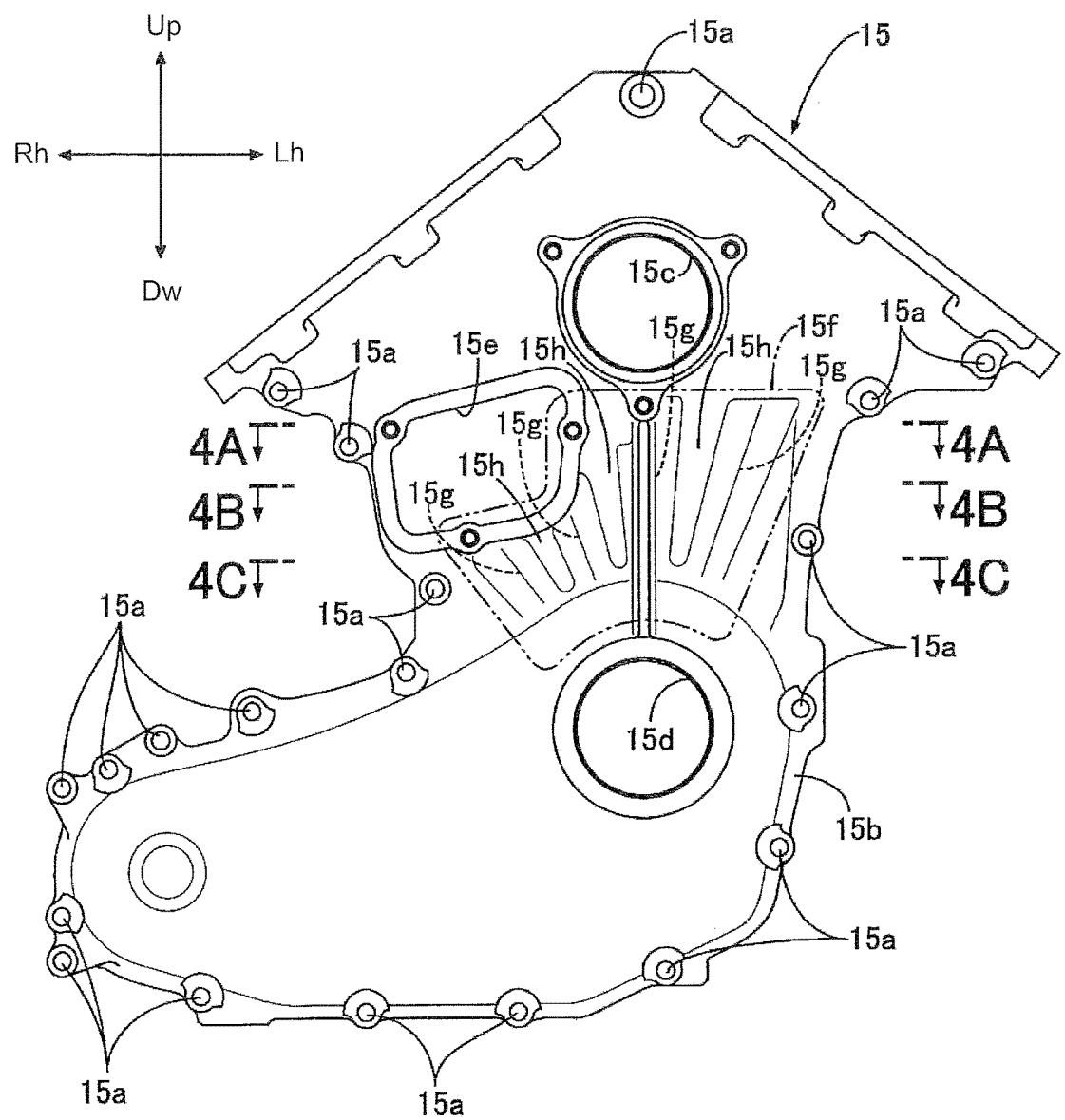
FIG. 3 is a front view showing an outer surface side of the chain cover.
Figure 4A:
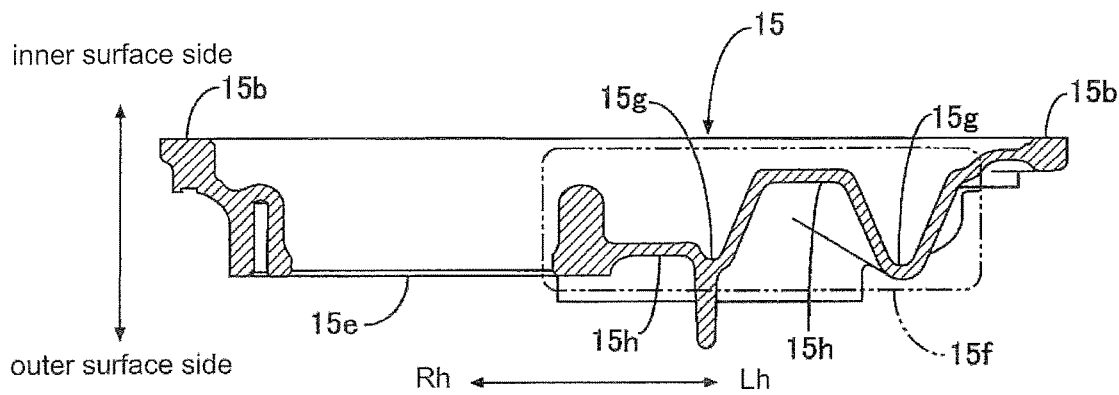
FIGS. 4A, 4B and 4C are cross sectional views taken on line 4A-4A, line 4B-4B, and line 4C-4C of FIG. 3, respectively.
Figure 4B:
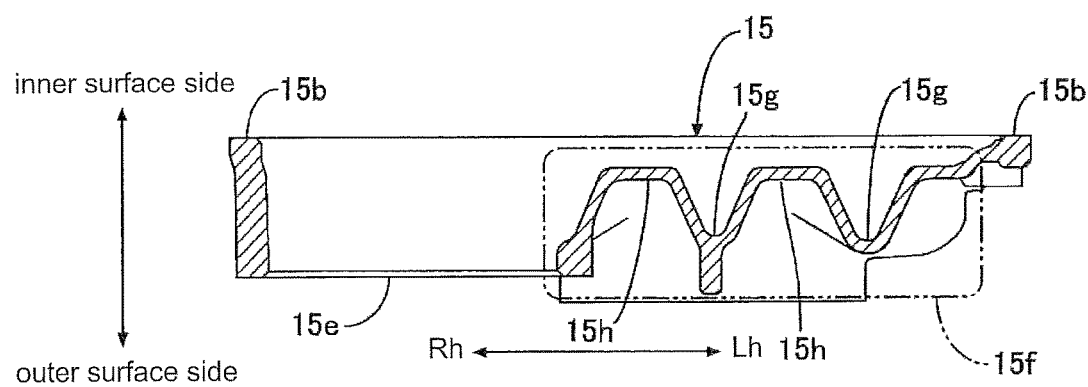
Figure 4C:
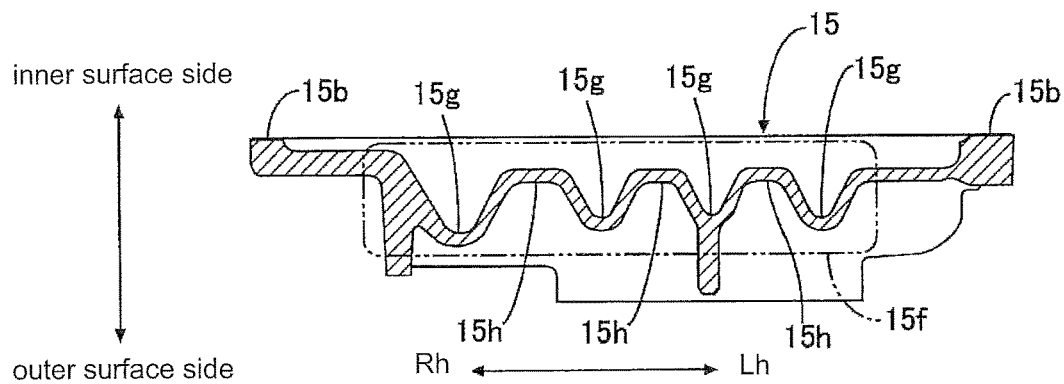
Figure 5:
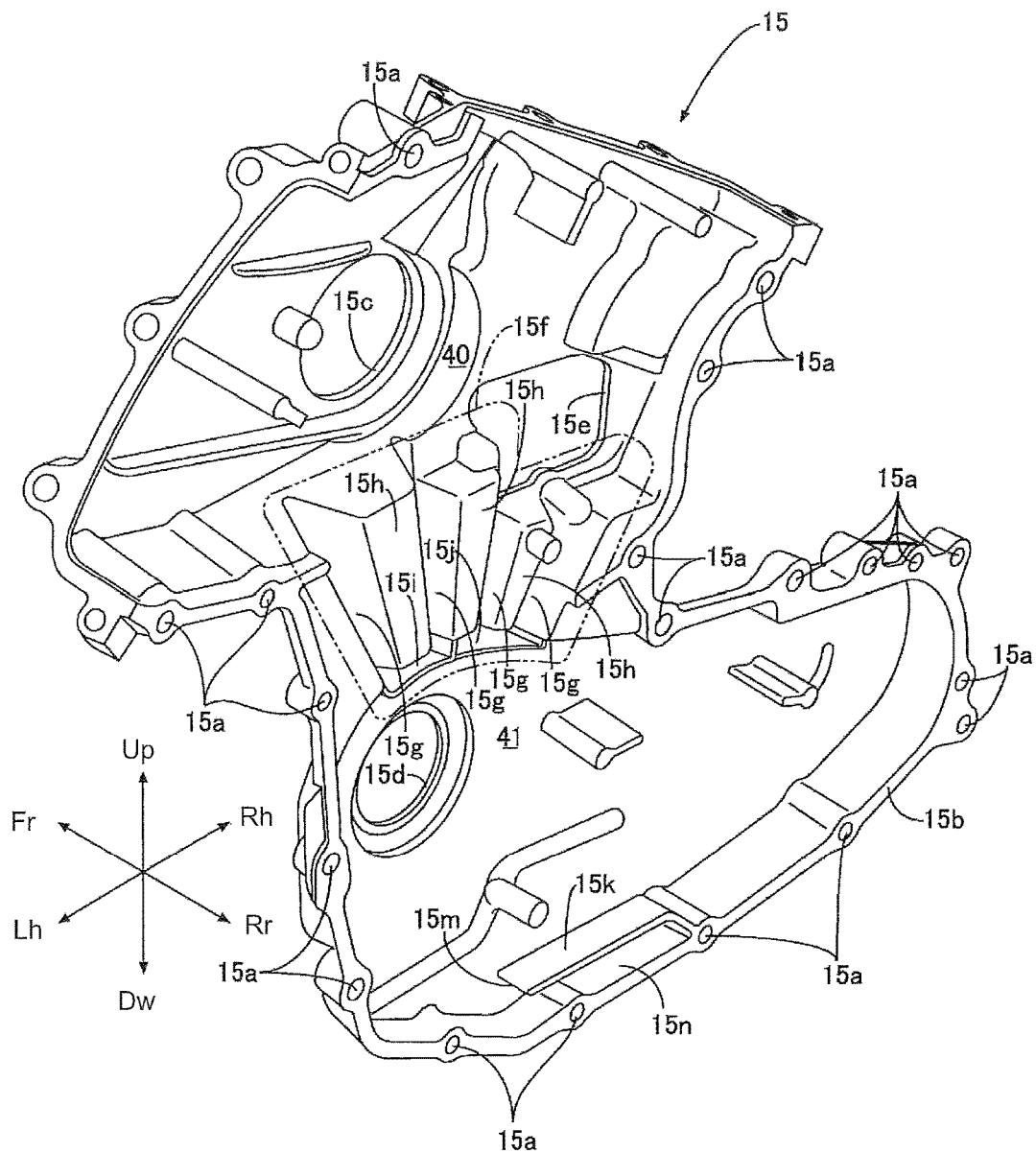
FIG. 5 is a perspective view in which the chain cover is seen from the inner surface side thereof.

As apparent from FIGS. 3 to 5, on the inner surface side of the protruding part 15f, there are formed four first recessed grooves 15g of triangular cross section which extend radially upward from the through hole 15d facing the crankshaft 11. Further, on the outer surface side of the protruding part 15f, there are formed three second recessed grooves 15h of trapezoidal cross section which extend radially upward from the through hole 15d facing the crankshaft 11. Two first recessed grooves 15g, 15g and one second recessed groove 15h have upper ends terminating at a lower edge of the opening part 15e, so that two first recessed grooves 15g, 15g and two second recessed grooves 15h, 15h on the left side have upper ends each of which is located in a higher position than the upper ends of two first recessed grooves 15g, 15g and one second recessed groove 15h on the right side.

Groove bottoms of these four first recessed grooves 15g are formed in a sharp triangular shape, while groove bottoms of these three second recessed grooves 15h are flat and extend in the direction orthogonal to the axis of the crankshaft 11. The groove bottoms of the first recessed grooves 15g are inclined to the inner surface side of the main chain cover 15 from upward to downward, so that depths of the first recessed grooves 15g become shallower from upward to downward, while depths of the second recessed grooves 15h are substantially even in the upward and downward direction (see FIGS. 6 and 7). The first recessed grooves 15g and the second recessed grooves 15h are formed alternately in the left and right direction so that a cross section of the protruding part 15f is formed in a corrugated plate shape of substantially uniform thickness.

Figure 6:
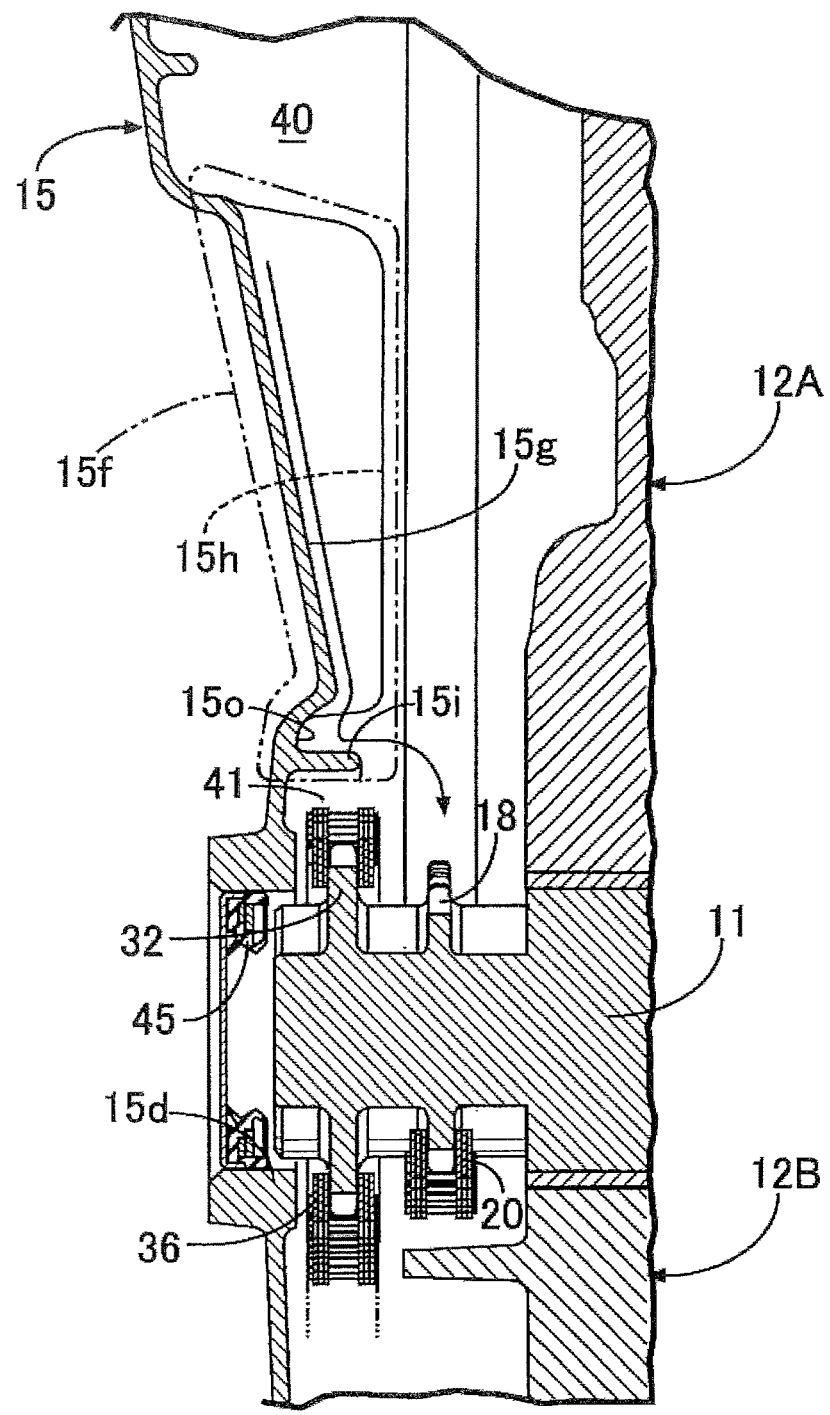
FIG. 6 is a cross sectional view taken on line 6-6 of FIG. 1.
Figure 7:
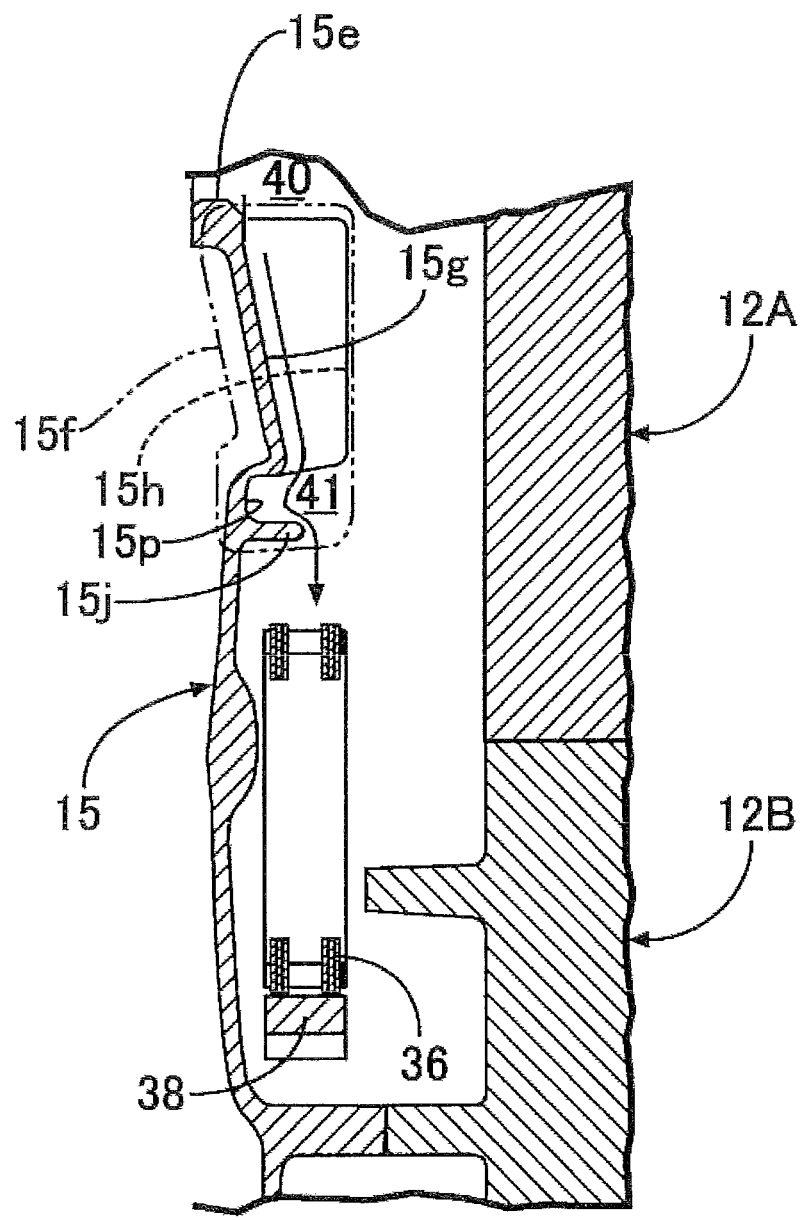
FIG. 7 is a cross sectional view taken on line 7-7 of FIG. 1.

As apparent from FIGS. 5 to 7, lower end positions of the first recessed grooves 15g and the second recessed grooves 15h are aligned in an arc shape so as to surround an upper part of the through hole 15d. A first eaves part 15i and a second eaves part 15j project inwardly from the inner surface of the main chain cover 15 in positions spaced apart at a predetermined distance from lower ends of the first recessed grooves 15g and the second recessed grooves 15h. The first eaves part 15i on the left side and the second eaves part 15j on the right side are formed circularly continuous with each other so as to surround an upper part of the through hole 15d, and both ends of the first eaves part 15i and the second eaves part 15j are bent upwardly, so that a first oil sump 15o which is recessed toward the outer surface side of the main chain cover 15 is formed between the eaves part 15i and the lower ends of the first recessed grooves 15g and the second recessed grooves 15h, and a second oil sump 15p which is recessed toward the outer surface side of the main chain cover 15 is formed between the second eaves part 15j and the lower ends of the first recessed grooves 15g and the second recessed grooves 15h. The projecting height of the first eaves part 15i which extends toward the inside of the main chain cover 15 is set so as to be higher than the projecting height of the second eaves part 15j (see FIGS. 5 to 7).

Namely, a tip of the first eaves part 15i having a larger projecting amount extends beyond a central position in the width direction of a teeth portion of the scavenging pump drive sprocket 32 up to substantially the same position as an inner surface of the teeth portion (see FIG. 6), while a tip of the second eaves part 15j having a smaller projecting amount extends up to the central position in the width direction of the teeth portion of the scavenging pump drive sprocket 32 (see FIG. 7).

The first eaves part 15i is positioned above the scavenging pump drive sprocket 32 as a whole, and a lowermost portion in the upward and downward direction of the first eaves part 15i, namely, a leftmost portion of the first eaves part 15i is positioned above a meshing region in which the cooling water pump driving chain 20 meshes with the cooling water pump drive sprocket 18 which rotates in the clockwise direction in FIG. 2. Moreover, the second eaves part 15j has a portion positioned above the scavenging pump drive sprocket 32. A lowermost portion in the upward and downward direction of the second eaves part 15j, namely, a rightmost portion of the second eaves part 15j is positioned above the scavenging pump drive chain 36.

Referring again to FIGS. 1 and 2, the reserve tank 42 for storing the oil is located on the upper part of the left bank 13. The oil collected from a bottom part of the crankcase 12 by the scavenging pump 33 is fed from the reserve tank 42 into an oil gallery of the crankcase 12 by a feed pump 43 thereby to be used for lubrication of a lubricated part such as a valve gear mechanism or the like. In the bottom part of the crankcase 12 there is formed an oil suction port 12a which communicates with the scavenging pump 33. In lower parts of the lower crankcase half body 12B and the main chain cover 15, one oil suction chamber 12d, 15n having one opening portion 12c, 15m is formed by covering an upper part of the oil suction port 12a with a wall portion 12b of the lower crankcase half body 12B and a wall portion 15k of the main chain cover 15 which are butted against each other (see FIGS. 2 and 5).

Next, the operation of the embodiment of the present invention provided with the above structure will be explained.

The oil stored in the bottom part of the lower crankcase half body 12B is collected into the reserve tank 42 by the scavenging pump 33, and, thereafter, fed into the lubricated part such as the valve gear mechanism or the like of the internal combustion engine E by the feed pump 43. The oil having lubricated the part to be lubricated flows downward by gravity into the bottom part of the lower crankcase half body 12B. Since such dry sump type lubrication system is adopted, an oil pan which is required when an ordinary wet sump type lubrication system is adopted can be dispensed with, so that the dimension in the upward and downward direction of the internal combustion engine can be reduced and the oil can be steadily fed into the part to be lubricated at the time of a sharp turn of the vehicle.

By the way, a portion of the oil having lubricated the valve gear mechanism and the like of the left and right banks 13, 14 is splashed in the upper space 40 sandwiched between an inner lateral surface of the main chain cover 15 and an outer lateral surface of the crankcase 12. The oil flows downward by gravity along channel-like inner lateral surfaces of the first recessed grooves 15g of the protruding part 15f and mountain-like inner lateral surfaces of the second recessed grooves 15h of the protruding part 15f so that the oil is temporarily retained by surface tension in the first oil sump 15o and the second oil sump 15p which are located below the first and second recessed grooves. Thereafter, the oil drops down from the tips of the first eaves part 15i and the second eaves part 15j constituting bottom walls of the first oil sump 15o and the second oil sump 15p and is returned to the bottom part of the lower crankcase half body 12B.

Since the four first recessed grooves 15g are formed radially with the crankshaft 11 as a center, the oil flowing downward along the four first recessed grooves 15g is concentrated in the axial end portion of the crankshaft 11 at the time the oil flows downward along the inner lateral surface of the protruding part 15f, so as to be able to lubricate effectively the cooling water pump drive sprocket 18 and the scavenging pump drive sprocket 32 which are located on the axial end portion of the crankshaft 11.

Further, the scavenging pump drive sprocket 32 and the cooling water pump drive sprocket 18 are provided, in order from the near side to the chain cover 15, integrally on the axial end portion of the crankshaft 11. However, since the first eaves part 15i and the second eaves part 15j which project inwardly are provided on the lower end of the protruding part 15f (see FIGS. 6 and 7), and the projecting heights of the first eaves part 15i and the second eaves part 15j are configured to be different from each other, the oil flowing downward along the four first recessed grooves 15g and the three second recessed grooves 15h is deviated in the axial direction of the crankshaft 11 by the first eaves part 15i and the second eaves part 15j, so that each of the scavenging pump drive sprocket 32 and the cooling water pump drive sprocket 18 located at the different distances from the main chain cover 15 can be lubricated effectively.

Especially, the tip of the first eaves part 15i extends beyond the central position in the width direction of the teeth portion of the scavenging pump drive sprocket 32 up to substantially the same position as the inner surface of the teeth portion. The first eaves part 15i is positioned above the scavenging pump drive sprocket 32 as a whole. In addition, the lowermost portion in the upward and downward direction of the first eaves part 15i is positioned above the meshing region of the cooling water pump drive sprocket 18. Therefore, the oil can be fed sufficiently into this meshing region so as to lubricate the region.

Further, the tip of the second eaves part 15j extends up to the central position in the width direction of the teeth portion of the scavenging pump drive sprocket 32. A portion of the second eaves part 15j is positioned above the scavenging pump drive sprocket 32. In addition, the lowermost portion in the upward and downward direction of the second eaves part 15j is positioned above the scavenging pump drive chain 36. Therefore, the scavenging pump drive chain 36 can be mainly lubricated by the oil fed from the second eaves part 15j, and the scavenging pump drive sprocket 32 can be lubricated by the portion of the oil.

As explained above, since the protruding part 15f protrudes inwardly from the inner surface of the main chain cover 15, and the first recessed grooves 15g are formed in the protruding part 15f, the oil can be guided to the axial end portion of the crankshaft 11 without providing a special reinforcing rib, and the weight can be reduced by dispensing with such rib. In addition, although, when a plurality of ribs cross each other, the oil is collected in the crossing region thereby not to be guided smoothly, the first recessed grooves 15g is formed in a simple channel shape thereby to be able to guide the oil smoothly.

Further, since in the protruding part 15f, the four first recessed grooves 15g on the inner surface side and the three second recessed grooves 15h on the outer surface side is formed alternately in the left and right direction, the protruding part 15f is configured to have a cross section of corrugated shape of substantially uniform thickness (see FIG. 4). As a result, a plane part of the main chain cover 15 is divided into small sections by the first recessed grooves 15g and the second recessed grooves 15h so as to increase the rigidity whereby the film surface vibration of the main chain cover 15 can be suppressed effectively while the main chain cover 15 has a light weight structure.

Especially, since the first recessed grooves 15g and the second recessed grooves 15h are reduced in groove cross sectional area toward the through hole 15d facing the crankshaft 11 (see FIG. 4), the oil flowing downward along the first recessed grooves 15g can be concentrated more accurately into the crankshaft 11. Moreover, although the main chain cover 15 is located close to the crankshaft 11 constituting a vibration source and in the vicinity of the through hole 15d which decreases the rigidity, so that the vibration is easily generated, the main chain cover 15 is divided into smaller sections with approach toward the through hole 15d by the first recessed grooves 15g and the second recessed grooves 15g which are reduced in cross sectional area toward the through hole 15d. Therefore, the rigidity of the main chain cover 15 in the vicinity of the through hole is increased whereby the vibration can be suppressed more effectively.

By the way, in FIGS. 2 and 5, assuming that the wall portions 12b, 15k for covering the oil suction port 12a of the lower crankcase half body 12B are not provided, since the position of the oil suction port 12a is offset from the center of the crankcase 12 to the right side, an oil level within the crankcase 12 at the time of turning to the right is inclined, by side force when the vehicle turns, so as to be shown by a line A', and the oil level within the crankcase 12 at the time of turning to the left is inclined so as to shown by a line B'. When the oil level at the time of turning to the right is inclined so as to be shown by the line A', a large amount of oil stays in the interior of the crankcase 12. Therefore, in the case where the total amount of oil is not increased by that amount accordingly, there is a possibility that a strainer inhales air within the reserve tank 42 so as not to feed the oil to the part to be lubricated.

However, according to this embodiment, there are provided the wall portions 12b, 15k for covering the oil suction port 12a, so that the opening portions 12c, 15m of the oil suction chambers 12d, 15n designating a substantial position of the oil suction port are moved to the neighborhood of the center of the crankcase 12. Accordingly, the oil level within the crankcase 12 at the time of turning to the right is located so as to be shown by a line A, and the oil level within the crankcase at the time of turning to the left is located so as to be shown by a line B, so that it is possible to prevent a large amount of oil from staying within the crankcase 12 and it is possible to suppress the inhalation of air by the strainer within the reserve tank 42.

Further, it is desired that the capacity inside the main chain cover 15 is reduced in order to minimize a required amount of oil, in the case where the dry sump type lubrication system which includes the scavenging pump 33 configured to collect the oil of the bottom part of the crankcase 12 into the reserve tank 42, and the feed pump 43 configured to feed the oil of the reserve tank 42 to the lubricated part is adopted. Since the main chain cover 15 is provided with the protruding part 15f which protrudes inwardly thereof, the capacity inside the main chain cover 15 is reduced by the protruding part 15f, whereby the required amount of oil can be reduced.

Although the embodiment of the present invention has been explained, various changes and modifications in design may be made in the invention without departing from the spirit and scope thereof.

For example, the number of the first recessed grooves 15g and the second recessed grooves 15h may be properly set without being limited to the embodiment.

Further, although, in the embodiment, the protruding part 15f is provided with both of the first recessed grooves 15g and the second recessed grooves 15h, the second recessed grooves 15h are not necessarily required and can be dispensed with.

Further, the cover member is not limited to the main chain cover 15 of the embodiment, and any cover member to be mounted on the crankcase 12 may be adopted.

Further, the shaft is not limited to the crankshaft 11 of the embodiment, and any shaft to be rotatably supported on the cover member may be adopted.

In order to achieve the above object, according to a first feature of the present invention, in a cover member to be mounted on a casing of an internal combustion engine, the cover member includes a through hole for rotatably supporting a shaft, a protruding part being positioned above the through hole and protruding toward an inside of the cover member, and a plurality of recessed grooves extending radially from the through hole so as to provide a connection between an upper part and a lower part of the inner surface side of the protruding part.

Further, according to a second feature of the present invention, in addition to the first feature, the cover member of the internal combustion engine includes a plurality of recessed grooves which extend radially from the through hole so as to provide a connection between an upper part and a lower part of an outer surface side of the protruding part. A cross section of the protruding part is formed in a corrugated plate shape by the recessed grooves on the inner surface side and the recessed grooves on the outer surface side.

According to a third feature of the present invention, in addition to the first or second feature, the cover member of the internal combustion engine has the recessed grooves on the inner surface side thereof which are reduced in groove cross sectional area toward the through hole.

According to a fourth feature of the present invention, in addition to any one of the first to third features, in the cover member of the internal combustion engine, the internal combustion engine has a dry sump type lubrication system which includes a scavenging pump configured to collect the oil of a bottom part of a crankcase into a reserve tank, and a feed pump configured to feed the oil of the reserve tank to a part to be lubricated.

By the way, a crankshaft 11 of an embodiment corresponds to the shaft described in the claims, a main chain cover 15 of the embodiment corresponds to the cover member described in the claims, a first recessed groove 15g of the embodiment corresponds to the recessed groove of the inner surface side described in the claim, and a second recessed groove 15h corresponds to the recessed groove of the outer surface side described in the claim.

According to the structure of the first feature, the cover member to be mounted on a crankcase of an internal combustion engine includes the through hole for rotatably supporting the shaft, the protruding part being positioned above the through hole and protruding toward the inside of the cover member, and the plurality of recessed grooves extending radially from the through hole so as to provide a connection between the upper part and the lower part of the inner surface side of the protruding part. Therefore, the rigidity of the cover member can be increased by the recessed grooves of the protruding part, without provision of ribs which increase the weight, so as to be able to suppress the vibration, and the oil inside the crankcase is collected by gravity around the through hole along the recessed grooves of the protruding part whereby the rotating shaft can be efficiently lubricated.

Further, according to the structure of the second feature, the plurality of recessed grooves are configured to extend radially from the through hole so as to provide a connection between the upper part and the lower part of the outer surface side of the protruding part, and the cross section of the protruding part is formed in a corrugated plate shape by the recessed grooves on the inner surface side and the recessed grooves on the outer surface side. Therefore, a plane part of the cover member is divided into small sections whereby the vibration can be suppressed more effectively, and the cover member can be thinned as a whole so as to reduce the weight.

Further, according to the structure of the third feature, since the recessed grooves on the inner surface side are reduced in groove cross sectional area toward the through hole, the oil flowing downward along the recessed grooves can be concentrated accurately into the shaft. Moreover, although the cover member is located close to the shaft constituting a vibration source and in the vicinity of the through hole which decreases the rigidity so that the vibration is easily generated, the rigidity of the cover member in the vicinity of the through hole is increased by the recessed grooves which are reduced in groove cross sectional area toward the through hole, whereby the vibration can be suppressed more effectively.

Further, according to the structure of the fourth feature, the internal combustion engine has the dry sump type lubrication system which includes the scavenging pump configured to collect the oil of a bottom part of the crankcase into the reserve tank, and the feed pump configured to feed the oil of the reserve tank to the lubricated part. Herein, although it is desired that the capacity inside the cover member is reduced in order to minimize a required amount of oil, the cover member is provided with the protruding part which protrudes inwardly thereof. Therefore, the capacity inside the cover member is reduced by the protruding part, whereby the required amount of oil can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A cover member to be mounted on a crankcase of an internal combustion engine comprising a first through hole for rotatably supporting a first shaft, a protruding part being positioned above the first through hole and protruding toward an inside of the cover member, and a plurality of first recessed grooves extending radially from the first through hole so as to provide a connection between an upper part and a lower part of an inner surface side of the protruding part, wherein the cover member further comprises a second through hole for supporting a second shaft, wherein the protruding part extends from the first through hole to the second through hole, and wherein a cross-sectional area of at least one first recessed groove of the plurality of first recessed grooves reduces continuously from the second through hole towards the first through hole.

2. The cover member according to claim 1, further comprising a plurality of second recessed grooves which extend radially from the first through hole so as to provide a connection between an upper part and a lower part of an outer surface side of the protruding part, wherein a cross section of the protruding part is formed in a corrugated plate shape by the first recessed grooves on the inner surface side and the second recessed grooves on the outer surface side.

3. The cover member according to claim 1, wherein the plurality of first recessed grooves on the inner surface side are reduced in groove cross sectional area toward the first through hole.

4. The cover member according to claim 1, wherein the internal combustion engine has a dry sump type lubrication system which includes a scavenging pump configured to collect an oil of a bottom part of the crankcase into a reserve tank, and a feed pump configured to feed the oil of the reserve tank to a part to be lubricated.

5. The cover member according to claim 1, further comprising a plurality of outer recessed grooves provided on an outer surface of the cover member and extending radially from the first through hole.

6. A cover of an internal combustion engine, comprising: a cover body to be mounted to a crankcase of the internal combustion engine, the cover body comprising: a first through hole to support a first shaft rotatably; a protruding part provided above the first through hole in an upward direction of the internal combustion engine and protruding toward an inside of the cover body facing the crankcase, the protruding part including a first upper part and a first lower part in the upward direction on an inner surface of the protruding part facing the crankcase; and a plurality of first recessed grooves extending radially from the first through hole so as to connect the first upper part and the first lower part of the protruding part wherein the cover body further comprises a second through hole for supporting a second shaft, wherein the protruding part extends from the first through hole to the second through hole, and wherein a cross-sectional area of at least one first recessed groove of the plurality of first recessed grooves reduces continuously from the second through hole towards the first through hole.

7. The cover according to claim 6, the protruding part including a second upper part and a second lower part in the upward direction of the internal combustion engine on an outer surface of the protruding part facing toward an outward direction of the internal combustion engine; the cover further comprising: a plurality of second recessed grooves extending radially from the first through hole so as to connect the second upper part and the second lower part, wherein the first recessed grooves and the second recessed grooves are shaped such that a cross section of the protruding part is in a corrugated plate shape.

8. The cover according to claim 6, wherein the first recessed grooves are reduced in groove cross sectional area toward the first through hole.

9. The cover according to claim 6, wherein the internal combustion engine has a dry sump lubrication system which includes a scavenging pump configured to collect an oil of a bottom part of the crankcase into a reserve tank, and a feed pump configured to feed the oil of the reserve tank to a part to be lubricated.

10. The cover according to claim 6, further comprising a plurality of second recessed grooves provided on an outer surface of the cover body and extending radially from the first through hole.

11. A cover of an internal combustion engine, comprising: a cover body to be mounted to a crankcase of the internal combustion engine, the cover body comprising: a first through hole having a center axis to rotatably support a first shaft about the center axis, the cover body having an axial direction in which the center axis extends and a radial direction perpendicular to the axial direction, the cover body having a cover body inner surface to face the crankcase and a cover body outer surface opposite to the cover body inner surface in the axial direction, the axial direction including an inward direction directed from the cover body outer surface to the cover body inner surface; a protruding part which is connected to the cover body and positioned apart from the first through hole in the radial direction, the protruding part protruding from the cover body inner surface in the inward direction, the protruding part having a protruding part inner surface connected to the cover body inner surface and a protruding part outer surface connected to the cover body outer surface, the protruding part inner surface having a first inner periphery facing the first through hole in the radial direction and a first outer periphery opposite to the first inner periphery in the radial direction; and a plurality of inner recessed grooves extending in the radial direction from the first outer periphery of the protruding part to the first inner periphery of the protruding part, wherein the cover body further comprises a second through hole for supporting a second shaft, wherein the protruding part extends from the first through hole to the second through hole, and wherein a cross-sectional area of at least one inner recessed groove of the plurality of inner recessed grooves the protruding part reduces continuously from the second through hole towards the first through hole.

12. The cover according to claim 11, the protruding part outer surface having a second inner periphery facing the first through hole in the radial direction and a second outer periphery opposite to the second inner periphery in the radial direction, the cover body further comprising: a plurality of outer recessed grooves extending in the radial direction from the second outer periphery of the protruding part to the second inner periphery of the protruding part, wherein the inner recessed grooves and the outer recessed grooves are shaped such that a cross section of the protruding part is in a corrugated plate shape.

13. The cover member according to claim 11, wherein a groove cross sectional area of the inner recessed grooves taken along a plane perpendicular to the radial direction are smaller as the groove cross sectional area approaches closer to the first through hole in the radial direction.

14. The cover member according to claim 11, wherein the internal combustion engine has a dry sump lubrication system which includes a scavenging pump configured to collect an oil of a bottom part of the crankcase into a reserve tank, and a feed pump configured to feed the oil of the reserve tank to a part to be lubricated.

15. The cover according to claim 11, further comprising a plurality of outer recessed grooves provided on the cover body outer surface and extending radially from the through first hole.

* * * * *